Jan. 6, 1925.
H. A. BEYNON
1,521,990
ELEVATING RACK FOR AUTOMOBILES
Filed July 3, 1922  3 Sheets-Sheet 1
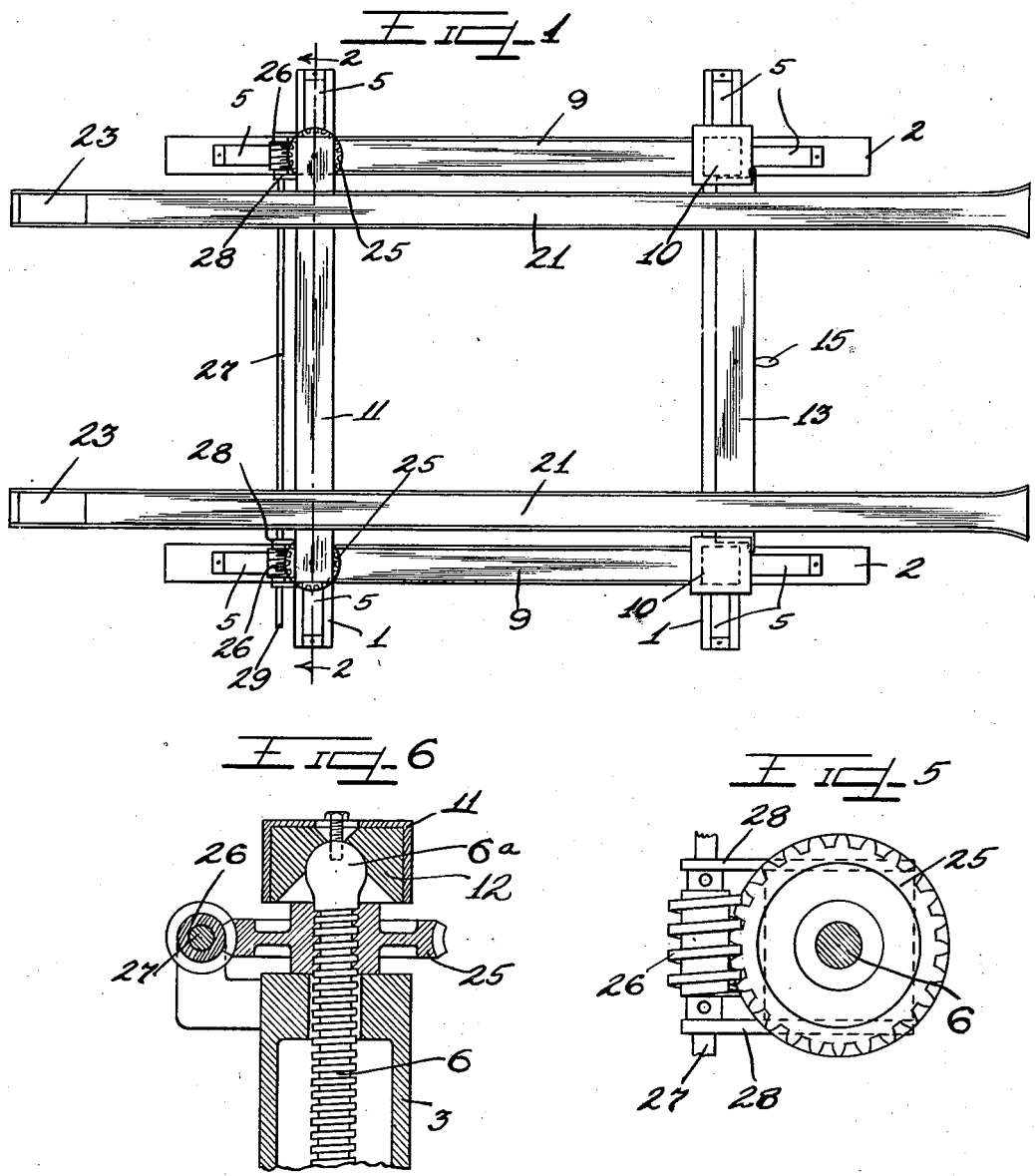

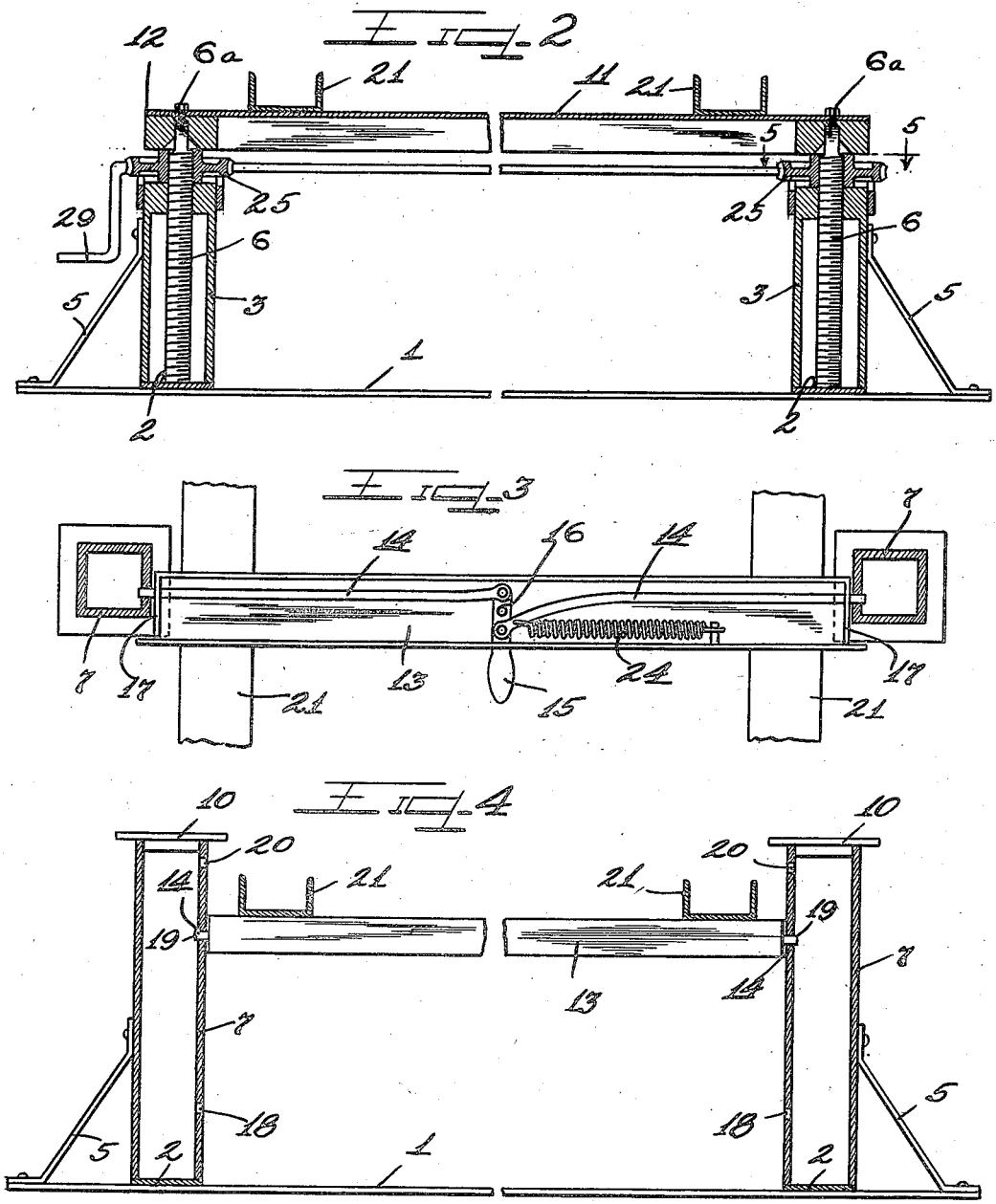

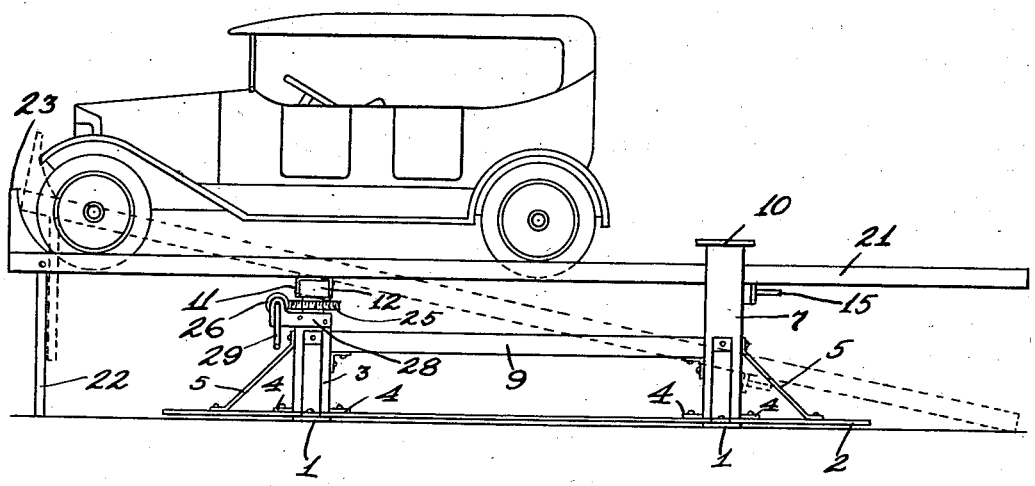
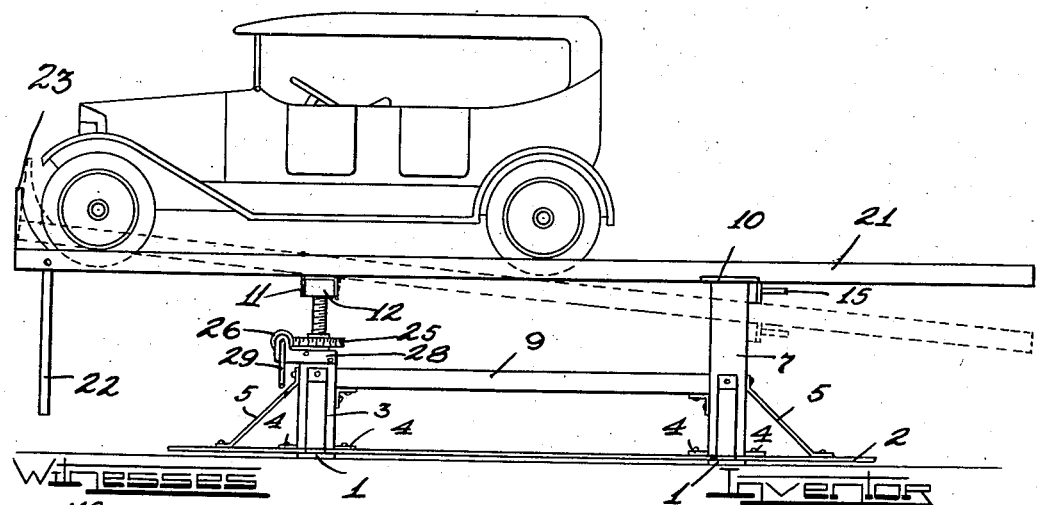

Patented Jan. 6, 1925.

1,521,990

UNITED STATES PATENT OFFICE.

HARRY A. BEYNON, OF KANSAS CITY, MISSOURI.

ELEVATING RACK FOR AUTOMOBILES.

Application filed July 3, 1922. Serial No. 572,564.

*To all whom it may concern:*

Be it known that I, HARRY A. BEYNON, a citizen of the United States, and a resident of the city of Kansas City, in the county of Jackson and State of Missouri, have invented certain new and useful Improvements in an Elevating Rack for Automobiles; and I do hereby declare that the following is a full, clear, and exact description of the same, reference being had to the accompanying drawings, and to the numerals of reference marked thereon, which form a part of this specification.

This invention relates to an elevating rack for vehicles such as automobiles.

And it is an object of this invention to provide a simple and easily operatable rack which can be adjusted for supporting a vehicle at different levels.

With these and other objects in view, which will become more apparent in the following description and disclosures, this invention comprises the novel mechanisms and combinations hereinafter described and more particularly pointed out and defined in the appended claims.

In the accompanying drawings, which illustrate a preferred embodiment of this invention, and in which similar reference numerals refer to similar features in the different views:

Figure 1 is a top plan view of the rack.

Figure 2 is an enlarged section on the line 2—2 of Figure 1.

Figure 3 is a fragmentary horizontal section through the rear posts looking up and showing the latching means for the rear end of the rack in plan view upon an enlarged scale.

Figure 4 is a vertical section through the rear posts showing parts in elevation upon an enlarged scale.

Figure 5 is an enlarged fragmentary detail view taken on the line 5—5 of Figure 2.

Figure 6 is an enlarged fragmentary and vertical sectional view through a front post showing the operating mechanism for the gears.

Figure 7 is an elevational view of the rack supporting an automobile upon the first level.

Figure 8 is a view similar to Figure 7 but illustrating the rack as supporting an automobile upon the second or higher level.

As shown on the drawings:

In the exemplification of this invention, there is shown a rack comprising a supporting base formed by the spaced parallel transverse members 1 and the spaced parallel longitudinally extending members 2 which are bolted or secured to the transverse members 1 at suitable points from the ends thereof. A pair of front hollow posts or supports 3 are secured to the longitudinal members at the points of intersection with the front transverse members 1 by means of laterally extending feet or flanges 4, and are braced in respect to said longitudinal and transverse members by means of the diagonal braces 5. The upper ends of these hollow front posts are provided with bearings through which screw rods 6 freely extend. The upper ends of said screw rods are provided with spherical heads 6$^a$.

A pair of rear hollow posts 7 are secured to the longitudinal members at the points of intersection with the rear transverse member by means of feet or laterally extending flanges 4 and are braced with respect to the transverse and longitudinal members by means of diagonal braces 5 similar to the braces of the front posts. The front posts and rear posts are also braced by the channel members 9 which are suitably secured between said posts. The rear posts are higher than the front posts and are closed at their upper ends by caps 10 which project beyond the lateral sides of the posts.

A platform is sustained by these posts and is adapted to be raised and lowered with respect thereto. In the present exemplification of this invention, this platform comprises a front channel-shaped transverse member 11 provided with suitable end bearings 12 having spherical-shaped bearing recesses for receiving the spherical heads 6$^a$ of the front posts, and screws may extend through slots in the member 11 and into the spherical heads for pivotally securing the same together; a rear channel-shaped transverse member 13 which fits between the two rear posts and is adapted to be sustained thereby at various heights by means of a pair of slidable rods 14 (Fig. 3) pivoted at their inner ends to a lever 15 projecting through a slot of the member 13 upon opposite sides of the pivot 16 which secures the lever to the under side of the web of the channel-shaped member 13; the opposite ends of said rods extending through apertures in end plates 17 constituting the ends of the channel member 13 for entering either of the sets of apertures 18, 19 and 20 made in the opposed faces of the rear posts, and a pair of spaced longitudinally extending grooved tracks 21 in the form of channel members secured to the said front and rear transverse members, and provided at their front ends with depending supports 22 loosely pivoted thereto. These tracks form a guiding runway for the vehicle wheels and extend sufficiently beyond the front transverse support 11 so that the vehicle may be properly balanced thereon, as shown in Figures 7 and 8, and sufficiently beyond the rear support 13 to form a proper incline up which the vehicle may be readily drawn under its own power. Proper abutments 23 are secured to the forward ends of the track 21 to arrest the vehicle when it has ascended the platform.

With reference to Fig. 3, it will be apparent that the spring 24 anchored to the transverse support 13 and the inner end of the adjacent rod 14 acts to project said rods 14 into the apertures in said posts and that by swinging the lever 15 on its pivot 16 against the tension of said spring 24 the rods 14 are withdrawn from the apertures in said posts whereby the rear end of the platform may be raised or lowered.

The front end of the platform is adapted to be raised and lowered by raising and lowering the screws 6. The mechanism for raising and lowering said screws comprises a pair of worm gears 25 threaded upon the screws 6 and resting upon the top of the front posts 3. The worm gears are adapted to be simultaneously rotated by means of worms 26 rigidly secured upon a transverse shaft 27 journalled in brackets 28 extending from the front posts, one end of said shaft being provided with a hand crank 29 whereby the same may be rotated for rotating the worms 26 which mesh with the worm gears 25 for imparting rotation thereto.

The operation is as follows:

In elevating a car upon the platform, the rear end of the latter is lowered as shown in dotted lines in Figure 7, the rods 14 being released and allowed to snap into the apertures 18 during this operation. The vehicle, which in the present instance is illustrated as being an automobile, may then be caused to travel up the inclined platform until it strikes the abutments 23, in which position the vehicle will be substantially balanced upon the platform with the front transverse member 11 as the fulcrum, so that the rear end of the platform may be easily elevated by withdrawing the rods 14 and lifting the platform until the rods snap into the apertures 19 which define the first level of the platform, as illustrated in full lines in Figure 7. Now, if it is desired to raise the vehicle higher, the hand crank 29 may be turned for rotating the worm gears 25 for raising the screws 6 for elevating the front part of the platform. The rear part of the platform may then be raised by unlatching the rods 14 and lifting the said platform until the rods 14 snap into the apertures 20. The vehicle and platform will then be in the second or higher position, as shown in Figure 8. If desirable, the front end of the platform may be elevated to the second level before the vehicle is run thereon, as is obvious.

It will accordingly be apparent that a very simple and readily operable vehicle elevating rack has been provided that balances the vehicle so that very little force, if any, is required to raise the rear inclined end of the platform, which, if released, may automatically rise when the vehicle becomes balanced.

I am aware that numerous details of construction may be varied through a wide range without departing from the principles of this invention, and I therefore do not purpose limiting the patent granted otherwise than necessitated by the prior art.

I claim as my invention:

1. In a vehicle elevating rack, a base, hollow posts secured to said base, screw rods extending through a pair of said posts and provided with spherical heads, a platform resting upon said heads and tiltable with respect thereto, and means for adjustably securing said platform to the remaining posts.

2. In a vehicle elevating rack, a base, a pair of front posts secured to said base, screw rods extending through said posts and provided with spherical heads, means for simultaneously operating said screw rods, a platform pivotally supported upon said spherical heads, a pair of rear posts each having a plurality of spaced apertures, and means on the rear portion of said platform for engaging said apertures for holding said platform at different levels.

3. In a vehicle elevating rack, a base, a pair of hollow forward posts secured thereto, jack screws extending through said posts, a platform pivotally supported upon said jack screws and tiltable with respect thereto, a pair of rear posts higher than the front posts, and means for adjustably securing said platform at different elevations to said rear posts.

In testimony whereof I have hereunto subscribed my name in the presence of two subscribing witnesses.

HARRY A. BEYNON.

Witnesses:
 SPENCER W. GIBBS,
 OSCAR HARTMANN.